United States Patent [19]

Lein et al.

[11] Patent Number: 4,814,832
[45] Date of Patent: Mar. 21, 1989

[54] AUTOMATIC VACUUM FEED AND HOLD DOWN ASSEMBLY FOR CAMERA SYSTEM

[75] Inventors: Juergen Lein, West Henrietta; Michael Brookmire, Pittsford; Robert Powers, Rochester; Joel Hotelling, Naples, all of N.Y.

[73] Assignee: Itek Graphix Corp., Waltham, Mass.

[21] Appl. No.: 149,647

[22] Filed: Jan. 28, 1988

[51] Int. Cl.$^4$ .............................................. G03B 27/60
[52] U.S. Cl. ................................................... 355/73
[58] Field of Search ................. 354/211; 355/35 H, 8, 355/28, 45, 18, 73, 85, 76, 87, 91

[56] References Cited

U.S. PATENT DOCUMENTS

| | | | |
|---|---|---|---|
| 1,234,416 | 7/1917 | Sweigard | 355/91 |
| 2,287,271 | 6/1942 | Powers | 354/211 |
| 2,519,610 | 8/1950 | Sussin | 355/73 |
| 3,369,449 | 2/1968 | Klauss | 355/18 |
| 3,420,608 | 1/1969 | Canale | 355/91 |
| 3,468,606 | 9/1969 | Wolf | 355/91 |
| 3,472,590 | 10/1969 | Fairbanks | 355/28 |
| 3,536,401 | 10/1970 | Mason | 355/28 |
| 3,617,127 | 11/1971 | McDuff | 355/73 |
| 3,722,999 | 3/1973 | Cunha | 355/45 |
| 3,922,087 | 11/1975 | Dillow | 355/87 |
| 4,018,523 | 4/1977 | Hughes | 355/8 |
| 4,175,857 | 11/1979 | Rapp | 355/73 |
| 4,298,272 | 11/1981 | Stievenart | 355/28 |
| 4,324,487 | 4/1982 | Nishihama | 355/73 |
| 4,353,647 | 10/1982 | Harrell | 355/85 |
| 4,362,380 | 12/1982 | Dragstedt | 355/354 |
| 4,408,872 | 10/1983 | Vaughn | 355/28 |
| 4,412,738 | 11/1983 | Ahern | 355/76 |
| 4,478,511 | 10/1984 | Miyauchi | 355/28 |
| 4,479,710 | 10/1984 | Vaughn | 355/28 |
| 4,529,300 | 7/1985 | Borjesson | 355/73 |

FOREIGN PATENT DOCUMENTS 2052125 6/1971 Fed. Rep. of Germany.
2253125 5/1974 Fed. Rep. of Germany.

OTHER PUBLICATIONS

IBM Technical Disclosure Bulletin, vol. 14, No. 7, Dec. 1971, Brochure entitled "The Dawn of a New Age in Vertical Camera Technology."

Primary Examiner—Richard A. Wintercorn
Attorney, Agent, or Firm—Morgan & Finnegan

[57] ABSTRACT

An automatic vacuum feed and hold down system is provided having a transport belt with vacuum grippers, a peripheral vacuum channel surrounding the platen, and a lead edge blow apparatus. In the preferred embodiment the transport belt consists of polyester fabric selectively coated with plastisol sealant to define a window area similarly shaped but smaller than the platen and suction grippers within the window area. In the preferred mode of operation a lifting apparatus raises the belt away from the exposed photosensitive sheet on the platen and the natural curl of the sheet, together with the lead edge blow, cause the sheet to release from the platen. The lifting apparatus then lowers the belt and suction is reapplied to the grippers, whereafter the belt and sheet are raised and advanced to deliver the exposed photosensitive sheet for processing.

25 Claims, 7 Drawing Sheets

AUTOMATIC VACUUM FEED AND HOLD DOWN ASSEMBLY FOR CAMERA SYSTEM

BACKGROUND OF THE INVENTION

1. Field of the Invention

The present invention relates generally to daylight cameras, and more particularly to vacuum feed assemblies which automatically transport photosensitive materials through the sequence of operations of such cameras.

2. Description of the Prior Art

The commercial appeal of a daylight camera that could automatically remove film from a storage receptacle, cut same to length, expose same, and transport the exposed film to a developer station has long been recognized. However, such objective has not yet been realized, although progress has been made in this quest by numerous conventional graphic arts systems. As an example, U.S. Pat. No. 4,089,603 granted May 16, 1978 to Robert D. Jacobs, and now assigned to Itek Graphix Corp. of Waltham, Mass., discloses a high speed vacuum support assembly for platemakers. The apparatus includes a first cover plate assembly having a transparent cover plate, and a second backing plate assembly including a relatively flexible backing sheet. The cover plate assembly is driven, by a motor, into contact with the photosensitive sheet supported therebetween, so that an airtight chamber is defined therebetween. The airtight chamber is evacuated (by a vacuum source) so that the flexible backing plate will be sucked toward the cover plate assembly, and drive the photosensitive sheet into film contact with the transparent cover plate.

U.S. Pat. No. 4,408,872, granted Oct. 11, 1983 to Quentin D. Vaughan, and assigned to Visual Graphics Corporation of Tamarac, Fla. discloses a vertically oriented, daylight camera system of particular relevance. This patent discloses a system in which a camera supports a table along which a cassette carriage is manually propelled. The carriage serves to store, and feed out, lengths of photosensitive material to a camera exposure station. A source of vacuum acting between a sheet of flexible, opaque plastic material and a translucent glass platen for the camera at the exposure station causes the film to be flattened against the platen prior to film exposure. Thereafter, vacuum is broken by movement of the carriage, and the exposed film is urged into the nip of rollers which carry the film through a developing station supported by the table. The exposed film is advanced toward the developing station by a brush-like member which picks up the trailing edge of the film; the brush-like member is secured beneath carriage 26.

U.S. Pat. No. 4,479,710, granted Oct. 30, 1984 to Quentin D. Vaughan, discloses refinements in the daylight camera system disclosed in U.S. Pat. No. 4,408,872, also granted to Quentin D. Vaughan and assigned to Visual Graphics Corporation of Tamarac, Fla. For example, U.S. Pat. No. 4,479,710 discloses protuberances formed on the underside of the flexible, opaque plastic sheet that is advanced by the manually operated cassette carriage across the platen of the camera; the protuberances insure smooth passage of the photosensitive material as it slides across the platen beneath the plastic sheet. U.S. Pat. No. 4,479,710 also discloses an elongated vacuum bar that assists in removing air from beneath the plastic sheet, as well as elongated plastic strips that enable the plastic sheet to be more easily lifted from the platen after the vacuum draw-down is terminated.

While the two patents granted to Quentin D. Vaughan represent improvements over previously known graphic arts systems, the Vaughan cameras rely upon manual operation of a cassette carriage in order to advance a length of photosensitive material, cut same to length, and advance the exposed film to a processing station. The back and forth movement of the cassette carriage across the table of the camera requires the continued presence of an operator, and increases the cost of operating the camera. The need to move the carriage in finite steps, to distinct locations on the table of the camera, calls for careful operation of the camera system, and reduces, potentially, the operational speed of the system. Also, to maintain the light-tight characteristic of the daylight camera system, Vaughan relies upon an elongated, flexible opaque sheet of plastic that is unwound from a roller situated at the rear of the cassette carriage; the effectiveness of this seal may diminish after extended use and stray light may enter the camera system.

U.S. Pat. Nos. 4,619,526 and 4,640,610 granted on Oct. 28, 1986 and Feb. 3, 1987, respectively, to Hougaard and Rasmussen and assigned to Eskofot A/S, disclose an automatic vertically oriented daylight camera system. The Eskofot patents disclose a vertical camera in which a sheet of photosensitive material is fed out and cut from a supply roll. As the sheet is cut, vacuum is activated to suction cups on the belt to grip the photosensitive sheet. The conveyor band is advanced while holding the photosensitive sheet until the photosensitive sheet is disposed at the desired location on the exposure platen. The vacuum to the suction cups is then terminated and vacuum is applied to longitudinal grooves adjacent to the exposure platen communicating with transverse grooves in the conveyor band to evacuate air under the belt, thereby holding the belt and photosensitive sheet against the platen during exposure. However, the structure disclosed in the Eskofot patents appears to simply drag the photosensitive sheet across the platen, subjecting the emulsion to scratching and other damage. In addition, Eskofot's attempt to move the sheet after exposure, even if accompanied by the "blow-under" of the 526 patent, would not appear to obtain reliable, repeatable release of the exposed sheet adhered to the platen.

Co-pending U.S. Pat. application Ser. No. 07/096,815 (attorney docket no. 1224-97B) filed in the name of Juergen Lein, commonly assigned herewith and entitled "Automatically Operated Vacuum Feed and Hold Down Assembly for Camera System" discloses a daylight camera system that automatically withdraws a length of photosensitive material from a supply roll, pauses while the material is cut to length, centers the sheet on the camera platen for exposure, assists in holding down the material for exposure, and then lifts the exposed sheet and advances the sheet to the camera processing station. The automatic feed assembly includes a transport belt wider than the platen and extending between first and second rollers at either end of the platen. The transport belt has two apertures operatively communicating with an air manifold block mounted to a vacuum pick-up bar secured to the top of the transport belt. The vacuum pick-up bar is attached to a belt lifting apparatus for raising and lowering the manifold block, belt and photosensitive material relative to the platen.

The transport belt is a laminate of plastisol and polyester fabric with the plastisol removed or omitted in a mesh-screen "window area" of the belt conforming in shape to the platen but slightly larger in size. As there disclosed, the mesh screen area extends over the openings through the belt.

In the foregoing disclosure, a length of photosensitive material is fed from a supply cassette to a first position, where the belt is lowered and vacuum is applied through the manifold block and associated apertures to the underside of the belt, causing the photosensitive material to adhere to the belt. The lift mechanism is activated to lift the belt and photosensitive material and the belt is advanced to a second position to measure out the desired length of material. The sheet is then cut by a rotary cutter. Thereafter, the belt and sheet are advanced to a third position to center the sheet over the platen, where the belt and sheet are lowered so that the cut sheet contacts the glass exposure platen. At the third position suction to the manifold and belt apertures is terminated and vacuum is applied to a hold-down channel around the perimeter of the platen in order to pull the cut sheet and belt snugly against the platen for exposure. After exposure, the suction applied to the perimeter channel is terminated and a momentary supply of positive airflow to the channel breaks the residual vacuum between the belt and the platen. Suction is then reapplied to the manifold and belt apparatus and the belt lift mechanism is actuated to lift the belt and exposed sheet for transport to a fourth position. At the fourth position vacuum to the manifold and belt apertures is terminated as the cut sheet is taken up by the rollers of the development apparatus. Although the apparatus disclosed and claimed in the foregoing application marks a distinct improvement over prior structures, difficulties experienced in practicing that structure detract from the reliability of the structure there disclosed. Most notably, it has been found that supplying positive airflow to the channel does not always obtain reliable release of the exposed sheet from the platen, making it difficult if not impossible to advance the exposed sheet for processing. The previously mentioned Eskofot patents would appear to suffer from the same disadvantage.

OBJECTS OF THE INVENTION

It is one object of the present invention to provide an automative vacuum feed and hold down system for a camera system which advantageously provides reliable and effective transport of the sheet across the platen.

It is another object of the invention to provide, in an automatic vacuum feed and hold down system for a camera system, a more effective release mechanism for releasing the photosensitive sheet from the platen after the exposure.

It is yet another object of the invention to provide an automatic vacuum feed and hold down system for a camera system having an improved hold-down apparatus.

It is another object of the present invention to provide an improved method of operating an automatic vacuum feed and hold down system for a camera system.

SUMMARY OF THE INVENTION

The present invention sets forth a vacuum feed assembly for a daylight camera system that automatically withdraws a length of photosensitive material from a supply roll, pauses while the material is cut to length, centers the sheet of material cut to length on the platen of the camera, assists in drawing-down the photosensitive material against the platen, obtains effective release of the exposed sheet from the platen, and then lifts and advances the exposed sheet of photosensitive material (cut to size) to the processing section of the camera. The vacuum feed assembly includes a transport belt with two apertures defined therethrough and an air manifold block, with two vertical channels and a central bore, operatively associated with the transport belt. An air hose is secured to the manifold block, and introduces suction pressure through the apertures to the photosensitive material being transported by the belt.

The transport belt is opaque, flexible and keeps stray light from passing through the platen of the camera. The belt is wider than the platen to increase its effectiveness, and extends between a first roller at one end of the platen and a second roller at the opposite end of the platen. The belt is compliant and conforms to the curvature of the roller about which it is being wrapped. In the preferred embodiment the belt is a laminate of plastisol on polyester fabric having areas where plastisol is removed or omitted. On the upper or top side of the belt plastisol is omitted in two areas to define the two apertures therethrough. On the lower, bottom or platen side plastisol is omitted from a "window area" conforming to the shape of the platen but slightly smaller in size. Within the window area, however, plastisol is applied around the two apertures through the belt. Also within the window area transverse fabric ribs are applied.

A vacuum pick-up bar is secured to the upper surface of the transport belt and travels therewith. The bar extends across the width of the belt, and the ends of the bar rest on a pair of spaced C-shaped tracks. Lifting links join the tracks to a rigid lifting frame that surrounds the tracks. A lift motor operates a drive link that raises the tracks and elevates the manifold block and belt, and the photosensitive material positioned therebelow. This precise raising and lowering operation takes place automatically, and at the desired points, in the cycle of operation for the daylight camera system.

A rigid belt frame is provided for the transport belt. Such frame includes three cross-members, including one that supports the lift motor, and two side frames. Four adjustable feet, one at each corner of the rectangular belt frame, keep the belt frame parallel to the glass platen of the camera and control the spacing between the belt and the platen.

A chain extends about sprockets secured to the exterior of one of the side frames of the rigid belt frame, whereas the transport belt, and the rollers for the transport belt, are situated within the confines of the belt frame. A reversible motor drives the sprockets and advances the chain; the movement of the chain is transmitted to both of the rollers about which the transport belt is secured. The roller winds up, or pays out, the transport belt. Lugs on the chain cooperate with switches on the side frame to control the travel of the transport belt.

A large, generally rectangular main frame extends about the belt frame The main frame is hinged to the frame of the camera system, and can be pivoted upwardly to provide access to the transport belt assembly, the rigid belt frame, etc. An air cylinder is provided to retain the main frame in its opened position, and to permit the gradual lowering thereof.

A lead edge blow mechanism and improved method of operation are provided in order to accomplish more effective and reliable release of the exposed photosensitive sheet for transport to the developing station.

The above-described vacuum feed assembly realizes its stated objective of automatically withdrawing photosensitive material, cutting same to a desired length, centering the sheet of material on a glass platen, uniformly drawing down the sheet of material against the platen of the camera, releasing the exposed sheet from the platen, picking up the exposed sheet of photosensitive material (cut to length), and advancing same onto the nip of rollers that will introduce the exposed material to a developing or processing station. Realization of this objective presages significant commercial appeal for the resultant daylight camera system utilizing this vacuum feed system, for cost associated with manufacturing and operating this camera will be significantly reduced while the quality of the photographic exposure will be enhanced.

Numerous other advantages, and favorable attributes of the vacuum feed assembly, will occur to the skilled artisan when the appended drawings are construed in harmony with the ensuing description of the invention.

DESCRIPTION OF THE PREFERRED EMBODIMENT

Figure 1:
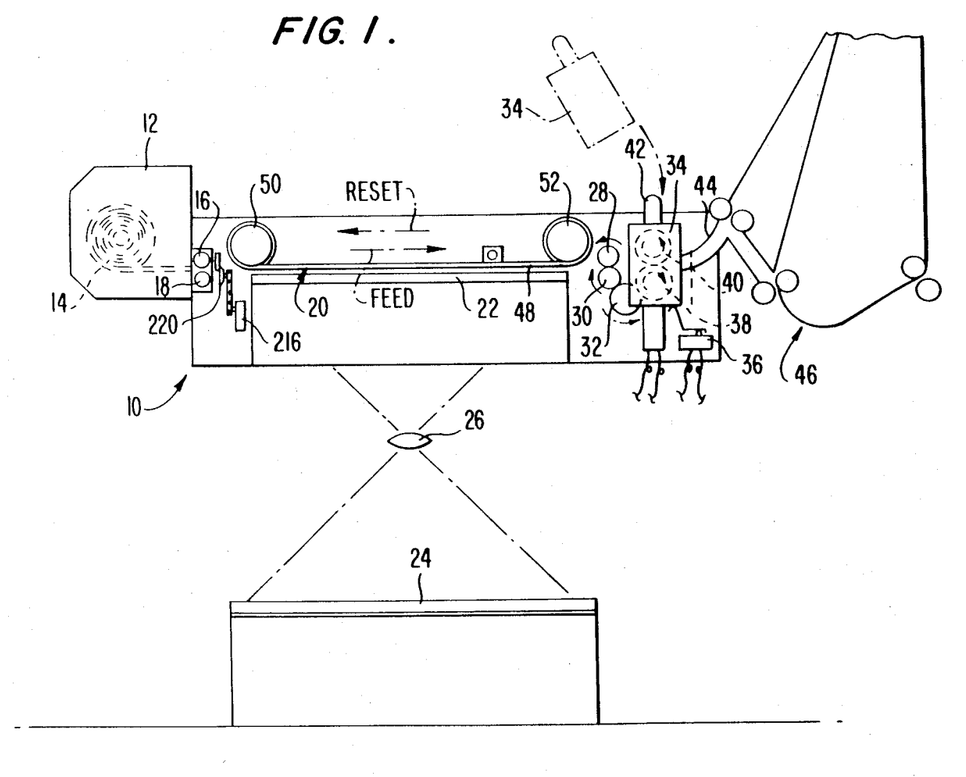
FIG. 1 is a schematic front elevational representation of a camera system within which the instant vacuum feed and hold down assembly may be utilized.

Turning now to the drawings, FIG. 1 depicts, in schematic fashion, a known daylight camera system 10 adapted to receive, and utilize, the present invention.

Camera system 10 includes a receptacle to receive, and retain, a cassette 12 containing a roll 14 of photosensitive material. Rollers 16, 18 are driven by a small motor (not shown) to withdraw a length of photosensitive material. A predetermined length of photosensitive material is then cut by a knife blade (not shown), and a transport mechanism 20, such as a belt, advances the cut length of material onto a glass platen 22. The sheet of material, cut to length, is centered on the platen, and then is positively forced, or drawn down by suction, to press firmly against the platen.

Graphic material is arranged on illuminated copyboard 24, and the camera, represented by lens 26, is adjusted relative to the copyboard. An exposure is then achieved, and the image is recorded on the sized sheet of photosensitive material. The exposed sheet of photosensitive material is then advanced by the transport belt 48 into the nip defined between rollers 28, 30. Rollers 28, 30 are power driven by another small motor (not shown). A compound gear 32 is operatively associated with the rollers 28, 30.

When the operator wishes to make a plate for multiple impressions, a removable transfer cartridge 34 is inserted into the camera system to receive the exposed lengths of photosensitive materials. The cartridge, which trips a switch 36 when inserted into the system, uses gears 38, 40 to drive rollers (not shown) within the cartridge to take up the photosensitive material in light-tight enclosure 34. The cartridge is picked up by handle 42 and removed to an alternative processor for completing the platemaking process.

Under usual conditions of operation, however, cartridge 34 will be absent, and the rollers 28, 30 will propel the sheet of exposed photosensitive material into guide 44, which leads into developer section 46.

Figure 2:
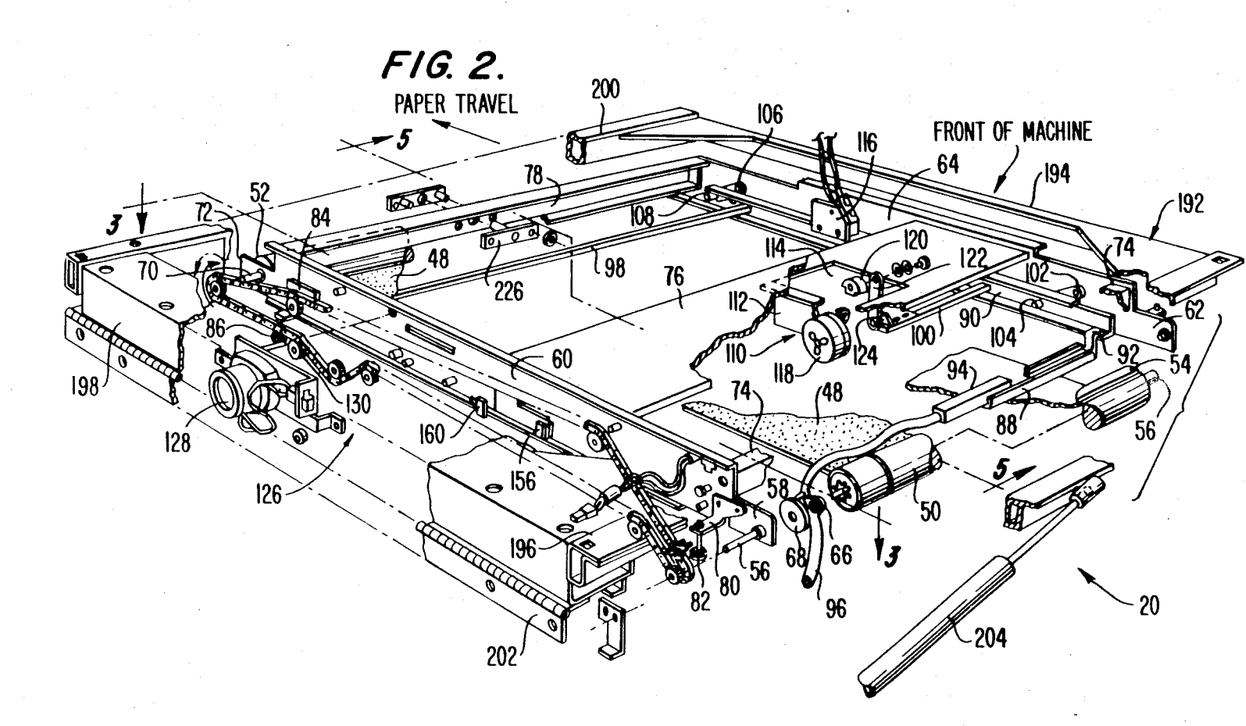
FIG. 2 is an exploded perspective view of a vacuum feed and hold down assembly constructed in accordance with the principles of this invention.

FIGS. 2–7, and particularly FIG. 2, depict the details of the vacuum feed assembly 20. In accordance with the principles of the present invention, the assembly 20 assumes the form of a belt 48 that extends between a first roller 50 and a second roller 52. One end of the belt fits within a groove 54 in roller 50, or is otherwise secured thereto, while the opposite end of belt 48 fits within a groove in roller 52, or is otherwise secured thereto. The belt is opaque, preferably black, and is longer and wider than the glass platen 22, to prevent stray light from entering the camera. The belt is a laminate of plastisol and polyester fabric so that the belt can conform to the surface of the rollers 50, 52 as it is wrapped thereabout and to the platen support. As illustrated in FIG. 1, rollers 50, 52 are displaced from the plane of platen 22 so that belt 48 does not drag across the platen. In practice, a distance of 0.010 to 0.020 inches has been found sufficient for this purpose.

An elongated shaft 56 extends laterally through roller 50. One end of shaft 56 projects through an ear 58 on first side frame 60, while the opposite end of shaft 56 projects through an ear 62 on second, opposing side frame 64. A torsion spring 66 and a collar 68 are slipped onto shaft 56 so that an elastic coupling is formed between roller 50 and shaft 56.

An elongated shaft 70 extends laterally through roller 52. One end of shaft 70 projects through an ear 72 on first side frame 60, while the opposite end of shaft 70 projects through an ear (not shown) on opposing side frame 64. Roller 52 is pinned to shaft 70.

A rigid frame surrounds the belt 48. Such frame comprises a first side frame 60 and a second side frame 64. Three cross-members are used to complete the frame and maintain the side frames parallel. The first cross-member is indicated by reference numeral 74 and is situated close to roller 50, while a second, centrally located cross-member is indicated by reference numeral 76, and the third cross-member is designated 78. Cross-members 74 and 78 are similar in shape, while cross-member 76 is considerably larger in size.

A first L-shaped bracket 80 is secured to side frame 60 adjacent to ear 58, and a support foot 82 extends upwardly through the bracket. A second L-shaped bracket 84 is secured to side frame 60 adjacent to ear 72, and a support foot 86 extends upwardly through the bracket A third support foot (not shown) is secured to ear 62 on side frame 64, and a fourth support foot is secured to another ear at the opposite end of side frame 64. The support feet are adjusted vertically so that the rigid belt frame, and the transport belt 48 associated therewith, can be maintained parallel to platen 22 (visible in FIG. 1, but not shown in FIG. 2).

A vacuum pick-up bar 88 is secured, by suitable adhesives, to the upper surface of belt 48. The bar is U-shaped when viewed in vertical cross-section. A first C-shaped track 90 is disposed interiorly of the side frame and extends longitudinally along the side frame between cross-members 74 and 78. An identical C-shaped track (not shown) is disposed interiorly of side frame 60. One end 92 of vacuum pick-up bar 88 rests upon, and travels along, track 90. The opposite end of vacuum bar 88 rests upon, and travels along, the companion track associated with side frame 60. The ends of the vacuum pick-up bar terminate in upstruck ears.

A rectangular manifold 94 is secured by screws 182, 184 (see FIG. 6) and adhesives to the upper surface of bar 88, and fits securely within the U-shaped confines of the bar. An air hose 96 is secured to the manifold to establish communication between a vacuum source and the interior of the manifold.

Spacer bars 98, 100 extend between track 90 and the companion track located interiorly of side frame 60. A first lift link 102 is secured to the interior of side frame 64, and a pin 104 at the lower end of link 102 projects through an opening in track 90. A second lift link 106 is also secured to the interior of track 90, and a pin 108 at the lower end of link 106 projects through another opening in track 90 near cross-member 78. Third and fourth lift links (not shown) are secured to the interior surface of side frame 60 in a similar manner; the four lift links enable the tracks and the vacuum pick-up bar 88 extending therebetween to move a limited distance in a direction that is perpendicular to the plane of belt 48.

The mechanism that lifts the C-shaped tracks relative to side frames 60, 64 is shown in FIG. 2 and is identified generally by reference character 110. Assembly 110 includes a bracket 112 that is located in proximity to a rectangular aperture 114 in cross-member 76. A switch 116 is secured to bracket 112, as suggested by the dashed lead lines, and a lift motor 118 is secured in proximity to the bracket. Switch 116 controls the "on" and "off" operation of lift motor 118. A cam 120 is mounted on the shaft of lift motor 118, and a drive link 122 has one end secured to an upstanding tab 124 that is secured to spacer bar 100. Lift motor 118, through the cam and its eccentric operation of drive link 122, is able to raise, and lower, the C-shaped tracks, which pivot about the lift links joined to side frames 60 and 64.

The mechanism that drives rollers 52 and 54, and thus controls the movement of belt 48 secured between these rollers, is identified generally by reference number 126. Mechanism 126 is shown in FIG. 2, on a reduced scale, but is amplified and shown on an enlarged scale in FIGS. 3 and 4. Mechanism 126 is situated on the exterior of side frame 60.

Figure 3:
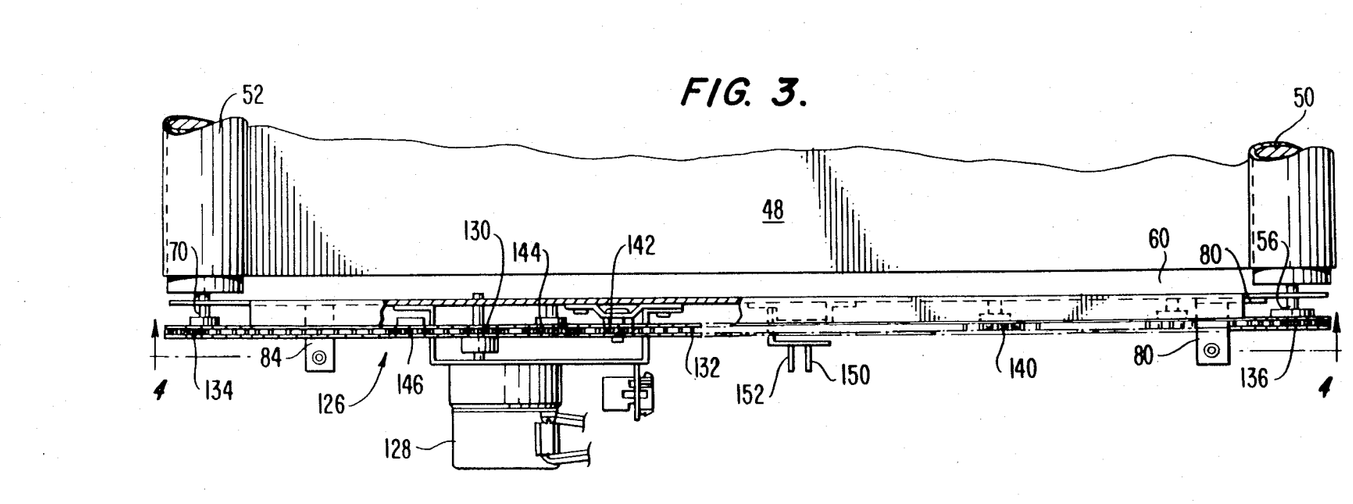
FIG. 3 is a fragmentary, top plan view of the transport belt advance mechanism, such view being taken along line 3—3 in FIG. 2 and in the direction indicated.
Figure 4:
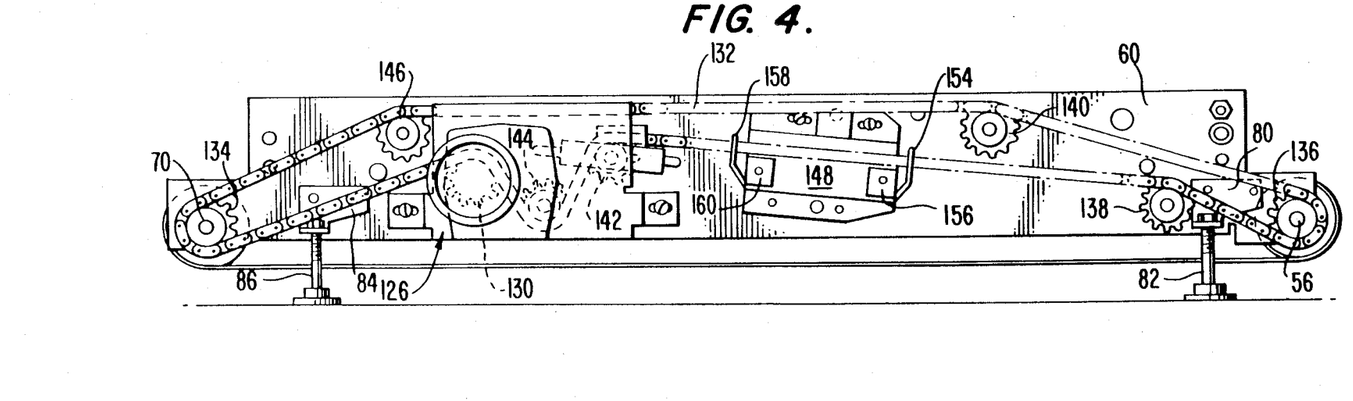
FIG. 4 is a side elevational view of the drive chain for the vacuum feed and hold down assembly, such view being taken along line 4—4 in FIG. 3 and in the direction indicated.

Mechanism 126 includes a reversible motor 128 that drives a main drive sprocket 130. The sprocket 130 drives an endless linked chain 132 that extends between a sprocket 134 secured to the end of shaft 70 and a sprocket 136 secured to the end of shaft 56. Additional sprockets 138, 140, 142, 144 and 146 guide the link chain and preclude excessive play or sag.

A mounting bracket 148 is secured to side frame 60 in proximity to chain 132. Lugs 150, 152 project outwardly from the chain. When the chain is advanced in one direction by motor 128, lug 150 contacts arm 154 on switch 156 on bracket 148 and closes such switch. The switch closure causes the motor 128 to reverse direction, and through drive sprocket 130, the chain is driven in the opposite direction. Such motion continues until lug 152 contacts arm 158 on switch 160 on bracket 148 and closes such switch. The driving of the chain in one direction moves belt 48 from roller 50 onto roller 52, while the driving of the chain in the opposite direction reverses the direction of movement of belt 48.

Figure 5:
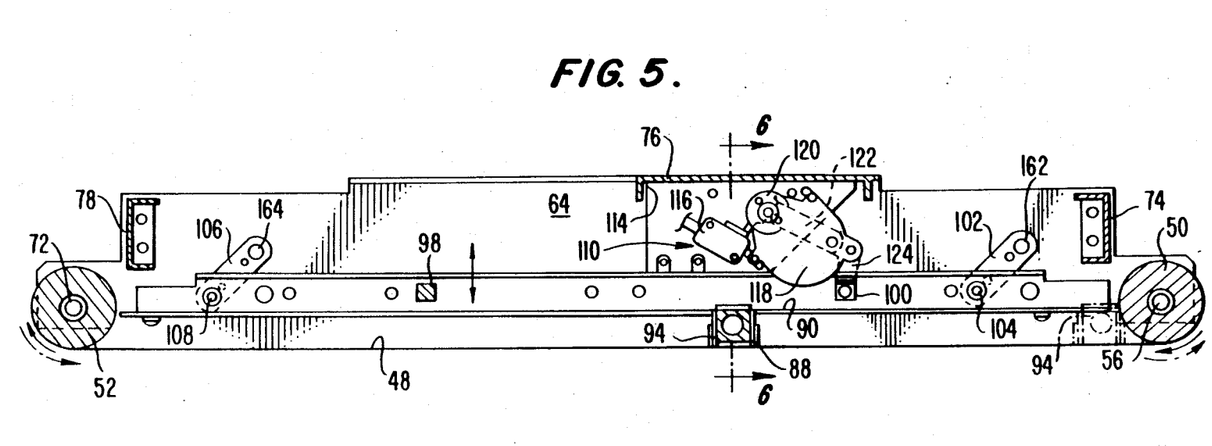
FIG. 5 is a side elevational view of the lifting frame for the transport belt of the vacuum feed and hold down assembly, such view being taken along line 5—5 of FIG. 2 and in the direction indicated.

FIG. 5 reveals additional details of the mechanism 110 that lifts the C-shaped tracks connected by lift links to the side frame 60 and 64 of the rigid belt frame. For example, the C shape of track 90, which has an upper and lower flange, is visible; the vacuum pick-up bar 88 travels across the width of track 90 while suspended between the lower flange of track 90 and the lower flange of the identical track secured inboard of side frame 60. The details of links 102 and 106 are also shown; link 102 is secured to side frame 64 by pivot pin 162, while link 106 is secured to side frame 64 by pivot pin 164. Cross-members 78 and 74 are C-shaped beams when viewed in end elevation. Details of the mechanism 110 that lifts the track 90 and the companion track inboard of side frame 60 are also shown on a larger scale than FIG. 2. The feed out and return movement of rollers 50, 52 as belt 48 is paid out, and taken up, is shown by the directional arrows located adjacent to the rollers. Similarly, the vertically directed, up and down movement of the tracks, and the vacuum pick-up bar suspended therefrom, is indicated by the two-headed arrow.

Figure 6:
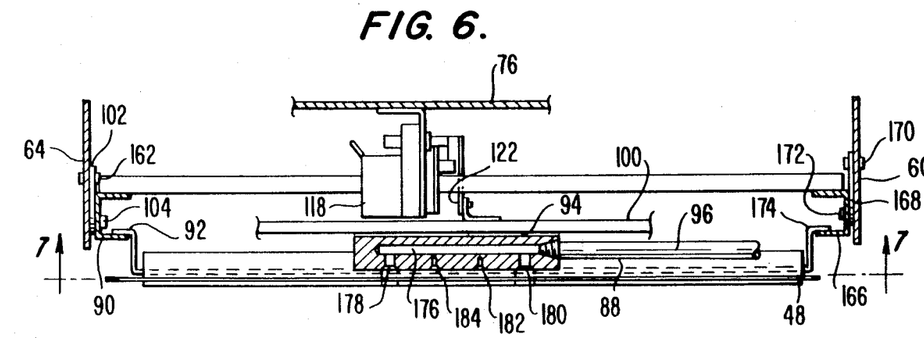
FIG. 6 is a transverse, cross-sectional view of the lifting frame, such view being taken along line 6—6 of FIG. 5 and in the direction indicated.

FIG. 6 shows the C-shaped track 166 that is positioned inboard of side frame 60 and is joined thereto by a pair of lift links. Tracks 90 and 166 are identical in shape and function. The lift links for track 166 are aligned with the lift links 102, 106 for C-shaped track 90, so that the tracks, which are joined together by spacer bars 98, 100, are moved as a unit. One of the pair of lift links 168 is shown in FIG. 6; such link is secured to side frame 60 by pivot pin 170 at its upper end, while the lower end of the link has a pin 172 which projects through an opening in track 166.

One end 92 of vacuum pick-up bar 88 rests upon track 90, while the opposite end 174 of the vacuum bar 88 rests upon track 166. Manifold 94 is secured with screws and adhesive sealant to bar 88, and is seated within a channel defined on the bar. A central bore 176 receives one end of air hose 96; the bore communicates with a first vertical channel 178 and a second vertical channel 180.

Figure 7:
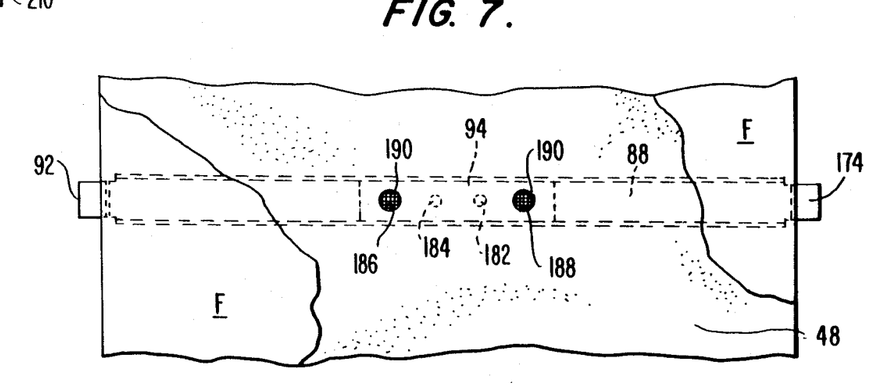
FIG. 7 is a fragmentary, bottom plan view of the transport belt, such view being taken along line 7—7 in FIG. 6 and in the direction indicated.

FIG. 7 shows the underside of transport belt 48, and the outline of the manifold 94 and vacuum pick-up bar 88 secured to the upper surface of the belt. The ends 92 and 174 of the vacuum pick-up 88, which project beyond the belt for engagement with tracks 90, 166, are also visible.

Figure 10:
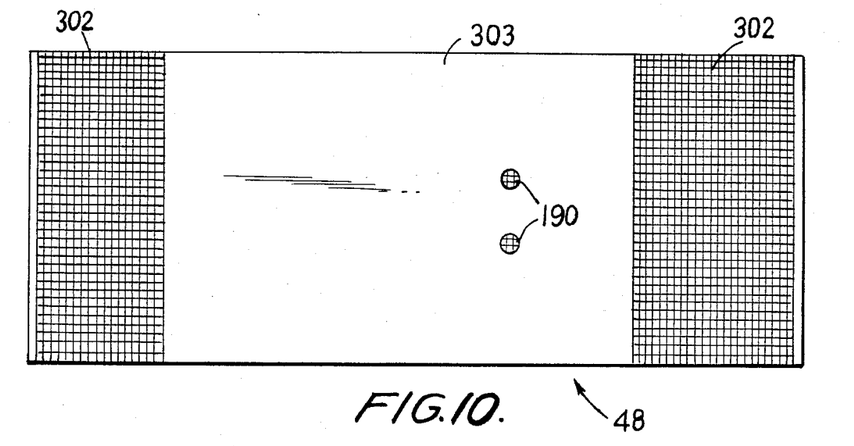
FIG. 10 is a top plan view of the preferred transport belt construction in accordance with the invention.
Figure 11:
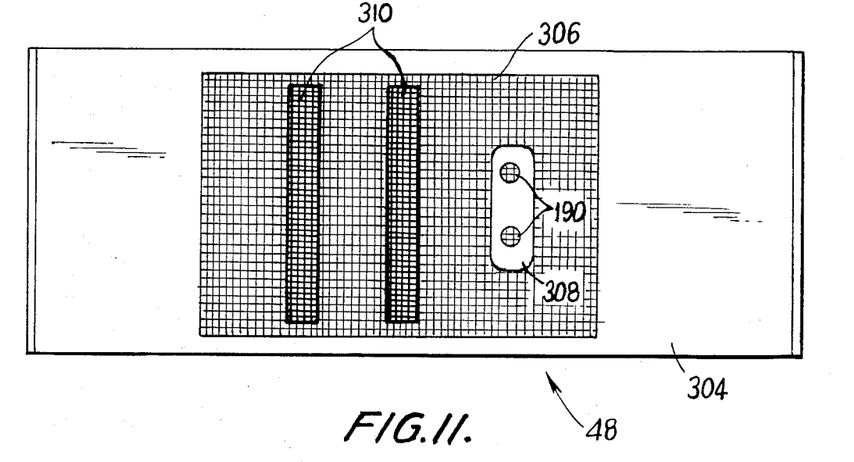
FIG. 11 is a bottom plan view of the preferred transport belt construction in accordance with the invention.

Two openings 186, 188 are formed through the thickness of the belt, and the manifold 94 is secured to the belt 48 with channels 178 and 180 in alignment with the openings. Preferably, a foam pad is secured by a suitable adhesive between the belt and the vacuum pick-up bar, with a sealant applied to the foam-pad surrounding the area where channels 178 and 180 communicate with openings 186, 188. Belt 48 is a laminate of plastisol and polyester fabric, as illustrated in FIGS. 7, 10 and 11. Plastisol is removed, or omitted, in two aligned areas 190 on the top and bottom of the belt to form two porous apertures through the belt. The polyester fabric appears as a porous mesh-screen 190 in FIG. 7. Mesh screen 190 extends across the openings 186, 188 so that the air flows through the belt. By virtue of this arrangement, a vacuum pump 214 (shown in FIG. 8) can deliver suction forces over air hose 96 to manifold 94 and thence through channels 178, 180 and aligned holes in the bar 88 and belt apertures 190 to the underside of the transport belt 48. The suction forces cause photosensitive material to adhere to belt 48, so that the belt can advance such material through successive steps in the operation of the daylight camera employing this film transport assembly. The channels need not be cylindrical over their entire length, but may widen out at their lower ends to form a larger air inlet area.

Figure 8:
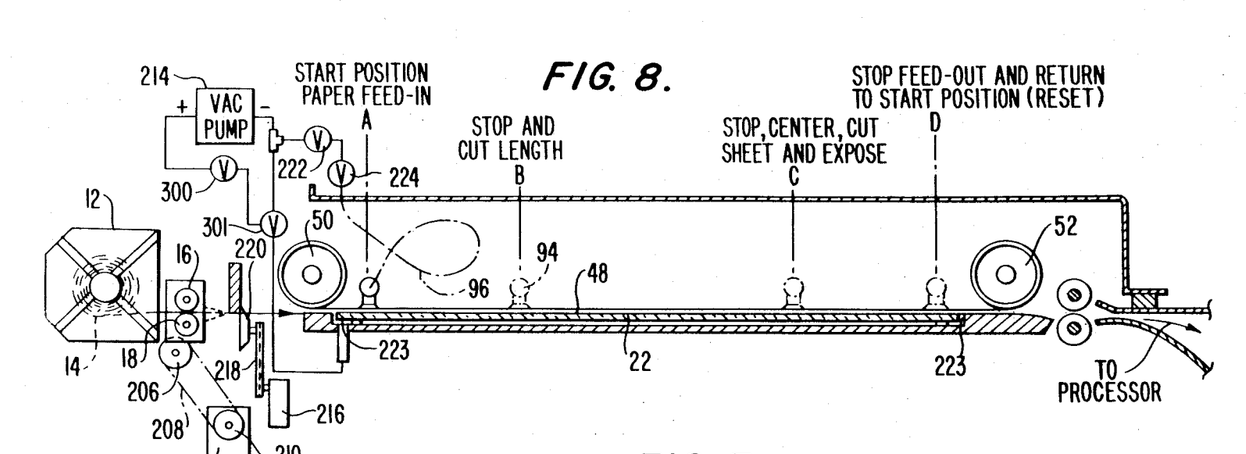
FIG. 8 is a schematic view of the sequence of operations performed by the vacuum feed assembly.

As also illustrated in FIG. 8, the positive air flow or exhaust port of vacuum pump 214 is connected to tube 312 disposed at the front edge of the platen and, hence, the lead edge of a photosensitive sheet as it is advanced through the camera from roll 14 to the processor station.

Figure 8A:
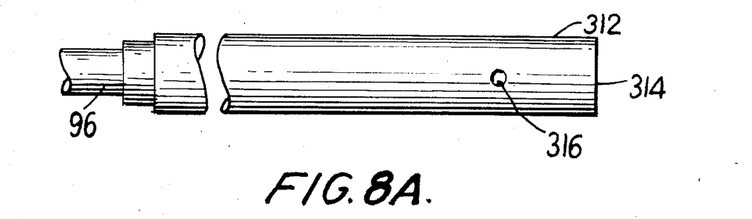
FIG. 8A is a partial section view of the functional diagram shown in FIG. 8, such view being taken along line 8—8 of FIG. 8 and illustrating the front edge blow tube.

FIG. 8A is an elevation view of tube 312 taken along line 8A of FIG. 8 in the direction shown. As shown in FIG. 8A, tube 312 is a metal tube sealed at end 314 and connected at the other, open end to a hose 316 which communicates with the positive air flow port of vacuum pump 214. An aperture 316 facing the direction of platen 22 and disposed approximately half way across the platen and belt 48 provides a concentrated air flow toward the platen at certain times during the camera cycle, as more fully explained below at the heading "Cycle of Operation." Preferably, aperture 316 is approximately 0.06 inches in diameter and delivers an air pressure of approximately 8 to 10 psi.

FIG. 10 is a top plan view of belt 48. As there shown, plastisol is applied to the top of belt 48 in all areas that may overlie platen 22 during exposure except mesh-screen apertures 190. In FIG. 10, the plastisol sealed area is shown as shaded portion 303, with unsealed areas shown as mesh-screen areas 190 and 302.

FIG. 11 is a plan view of the bottom of belt 48 showing the preferred construction of belt 48. As there illustrated, plastisol is applied in areas 304 to define a "window area" 306 which is sealed on the top belt surface but not on the bottom belt surface. The shape of window area 306 generally corresponds to the shape of platen 22 but is slightly smaller in size than platen 22. In the preferred embodiment, when window area 306 overlies platen 22 the edge of window area 306 is spaced approximately one-eighth to one-half inch from the edge of the glass platen 22 and, more specifically, channel 223 surrounding the edge of the platen. Within window area 306 plastisol is applied in an aperture surrounding region 308 to substantially seal mesh-screen apertures 190 from the remainder of unsealed window area 306 on the bottom of belt 48. In addition, fabric ribs 310 are secured to and protude from belt 48 within window area 306.

Preferably, fabric ribs 310 are strips of black dacron polyester approximately 0.38 inches wide, 0.010 inches thick and 11.75 inches long. Fabric ribs 310 should terminate within window area 310. The ends of ribs 310 may, for example, terminate approximately 0.38 inches from the edge of the window area. The fabric ribs are illustrated in FIG. 11 in mesh-screen fashion since the preferred dacron rib constitutes an unsealed fabric. The belt and plastisol are preferably black in color to increase the ability to prevent stray light from entering the camera system and reduce reflections during film exposures. Because of its construction, the belt advantageously exhibits excellent conformance to rollers 50, 52 and is substantially air-tight when drawn down against the platen of the camera system. It should be noted that the number, position and orientation of the ribs as shown are merely illustrative. It is contemplated that the number of ribs could be varied depending upon the desired rate of evacuation and that the ribs could extend other than the direction shown. It is also contemplated that bumps, dimples or other protuding structures other than ribs may obtain satisfactory results.

A rectangular, rigid main frame 192, comprising front channel 194, side channel 196, rear channel 198, and side channel 200 extends about the transport belt 48 and the related assemblies for advancing and returning such belt, as well as raising and lowering same, at appropriate times in the operational cycle of the camera system. A hinge 202 joins the main frame to the frame of the camera system, so that the main frame may be lifted upwardly to allow inspection, or repair, to the components housed therewithin. An air cylinder 204 retains the frame in its "up" position, and also controls its gradual downward motion toward its closed position.

CYCLE OF OPERATION

The sequence of operation for the above-described preferred embodiment of an automatically operated vacuum feed and hold down assembly system for a daylight camera is best understood by reference to FIGS. 8 through 11. Rollers 16, 18 withdraw a length of photosensitive material from roll 14 retained in cassette 12. As shown, the photosensitive material is unrolled from roll 14 with the emulsion side facing outward and, ultimately, downward toward the platen. The rollers are powered by gear 206, which is driven by chain 208 that passes about sprocket 210. A first motor 212 delivers power to sprocket 210.

The leading edge of photosensitive material F is advanced by rollers 16, 18 beyond roller 50 and onto platen 22 to a start position A. Vacuum pick-up bar 88 and belt 48 are in the raised or "up" position as the photosensitive material is fed out to position A. After the lead edge reaches position A, vacuum pick-up bar 88 is lowered and the vacuum pump 214 is turned on to provide suction forces to manifold 94 via hose 96. The forces are distributed through bores 178, 180 to the underside of belt 48 so that the photosensitive material is adhered thereto or "gripped" by the vacuum pick-up bar. The lift mechanism 110, including lift motor 118, is then actuated so that tracks 90, 166 are lifted relative to side frames 60, 64 to lift the vacuum pick-up bar 88 and belt 48 away from the platen, thereby spacing the face-down emulsion side of the photosensitive sheet a small distance from the platen. The drive mechanism 126, including reversible motor 128, drive sprocket 130, and chain 132 is then energized. The movement of chain 132 rotates rollers 50, 52 so that transport belt 48 is then advanced a calculated distance to station B with the lift assembly remaining in the raised position. The photosensitive material supply feed and the transport belt are moved at the same speed to station B. A second motor 216 is then turned on and such motor drives a cable 218 which moves rotary cutter 220 to cut the desired length of photosensitive material. During the cut cycle the lift assembly remains in the raised location. The drive assembly 126 then rotates roller 50, 52 to advance transport belt 48 to a predetermined position C so that the cut photosensitive sheet is centered over the platen. The lift assembly is then de-energized to lower the belt and cut sheet of photosensitive material onto the platen. The entire cut sheet is now in contact with glass platen 22.

Placement of the cut length of photosensitive material at station C ensures that the photosensitive material is centered upon the platen. After centering, three-way valve 222 terminates the suction forces flowing to transport belt 48 and, as the lift assembly lowers the belt to the platen, the suction forces are directed by valve 301 to a vacuum hold-down channel 223 around the perimeter of platen 22. The suction forces present in channel 223 draw the cut length of photosensitive material F against the platen, and also pull flexible, opaque belt 48 snugly thereagainst. Cross ribs 310 also aid in the initial evacuation of air under the belt by "tenting" the belt to facilitate rapid evacuation of air while ensuring that no isolated air bubbles are formed under the belt. The foregoing steps have been found to achieve satisfactory hold-down for line exposure work. However, to obtain high quality results in screen work it is preferred to evacuate the air under the belt more thoroughly, to the point of drawing the pick-up bar strongly against the belt and compressing the foam pad between the belt and the bar. Thus, for screen work it has been found desirable, after about four seconds with the photosensitive material adhered to the glass platen, to resume vacuum to belt 48 to enhance evacuation under the belt. This continues for about 35 seconds. Vacuum to belt 48 is again terminated, and the cut length of photosensitive material is pressed tightly against the platen for about 10 seconds by continued vacuum hold-down applied to channel 223. Thereafter, a high quality screen exposure can be made of the graphic arts materials placed upon the copyboard 24.

After the exposure, the suction forces to channel 223 are terminated and belt 48 is lifted away from the platen by the lift assembly, leaving the exposed photosensitive sheet adhered to the glass platen by friction, electrostatic and/or vacuum forces. Just before, e.g. for about 2 seconds, and as the belt is lifted, a switching valve 300 supplies a positive airflow to tube 312 to create the lead edge blow in the direction shown by arrow 313 to break the forces adhering the photosensitive sheet to the platen. The combined effect of the natural curl of the photosensitive sheet coming off roll 14, including single-sided emulsion effects, and the lead-edge blow from tube 312 obtain highly effective and repeatable release of the exposed photosensitive sheet from the platen. As the exposed sheet is released from the platen it is driven upward and held against the raised belt by the positive airflow. Preferably, the belt is held in the raised position with the lead edge blow on for about 10 seconds to ensure release of the photosensitive material from the platen. The belt is then lowered and suction force at the grippers is simultaneously resumed by directing vacuum to hose 96. The photosensitive material is driven against the belt by the positive airflow to enhance gripping of material as the belt is lowered. With the exposed photosensitive sheet firmly gripped by the belt, lift mechanism 110 is activated and the raised sheet and lift are advanced by belt drive assembly 126 toward rollers 28, 30. In this manner the photosensitive material F is advanced to station D. It is contemplated that the lead-edge blow could be applied from a different edge, such as the trailing edge. However, it is believed that air blow applied at any edge other than the lead edge will be less effective than the lead-edge blow.

At station D, the lifting frame remains raised but the suction force to belt 48 is terminated after the cut sheet has entered the nip of rollers 28, 30, which at this point are stationary. The rollers 28, 30 then start rotating and the photosensitive material is directed toward transfer cartridge 34 (if a plate is to be made) or toward developer section 46. The drive assembly 126 is again energized by lugs 150, 152 on chain 132 cooperating with switches 156, 160 so that the direction of chain travel is reversed; the reversal of chain travel is transmitted to rollers 50, 52 so that the transport belt 48 is returned to its starting position, position A.

Figure 9:
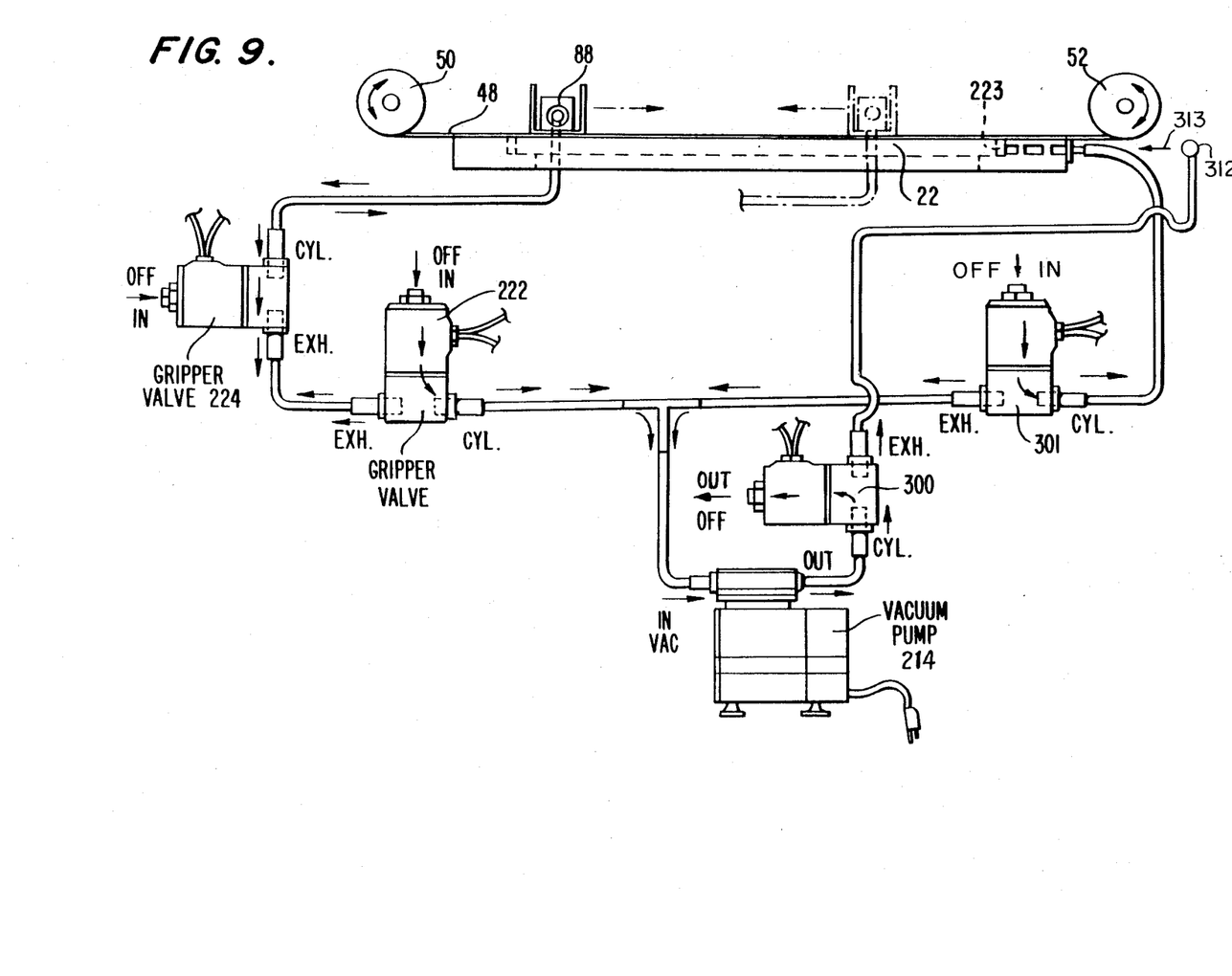
FIG. 9 is a schematic representation of the pneumatic circuit employed within the vacuum feed and hold down assembly.

In order to ensure the delivery at the proper time in the sequence of operations of the suction forces produced by vacuum pump 214 to the manifold 94 or to be vented, a vent valve 224 is utilized in conjunction with three-way valve 222. Similarly, to ensure delivery at the proper time of suction forces to the channel 223 or airflow to tube 312, valves 301 and 300, respectively, are provided. Valves 222, 224, 300, 301 may be solenoid operated valves responsive to timed control signals. A central processing unit provides the command signals to the lift assembly, drive assembly, vacuum pump, valves etc., to coordinate the timing for the diverse components of the daylight camera system, particularly the unique automatically operated vacuum feed system therefor.

Whereas a p referred embodiment of the vacuum feed system has been described above, numerous changes in such system will occur to the skilled artisan. The invention, for example, may find application in known cameras, X-ray equipment, photocopiers, and the like. While the transport belt may be made of a single ply of flexible plastic or rubber, the belt is usually formed of two, or more, plies of materials glued together. Similarly, belt materials other than polyester, dacron strips and plastisol sealant may prove useful in the invention. Also, a pivot pin 226 (FIG. 2) may be used for further adjustment of the belt frame and the belt with respect to glass platen 22.

Consequently, the appended claims should not be limited to their exact terms, but should be liberally construed in a manner consistent with the significant achievements in the useful arts and sciences realized by this invention.

What is claimed is:

1. A vacuum feed and hold down system for a camera including a supply of photosensitive material having a lead edge, a platen to receive the photosensitive material and an optical system to expose the photosensitive material, said vacuum feed and hold down assembly comprising:
   a movable flexible opaque transport belt disposed substantially parallel to the platen, said transport belt having at least one transport belt aperture therethrough;

a vacuum pick-up bar attached to the upper surface of said belt, said pick-up bar having at least one pick-up bar opening defined through said bar aligned with said transport belt aperture, said pick-up bar being connected to a vacuum source;

belt frame lifting means mounted above the platen for adjustably supporting said vacuum pick-up bar and said transport belt relative to the platen; and edge blow means for selectively providing positive airflow toward an edge of the photosensitive material.

2. The system according to claim 1 wherein said movable, flexible, opaque transport belt has a first side facing away from the platen and a second side facing the platen, said belt being formed of a porous material selectively coated with a sealant, said belt being coated with said sealant on said first side in substantially all areas overlying the platen except a first side belt aperture defining area, said belt being coated on said second side in substantially all areas surrounding the platen and being substantially uncoated in a window area conforming in shape to the platen but smaller in size than the platen, said belt aperture being formed by communication through said porous belt material of said uncoated first side belt defining area aligned with a portion of said uncoated window area on said second side.

3. The system according to claim 2 wherein said porous material further comprises a woven fabric.

4. The system according to claim 3 wherein said woven fabric is polyester.

5. The system according to claim 3 further comprising protrusion means adhered to said belt within the window area for enhancing evacuation of air under said belt.

6. The system according to claim 5 wherein said protrusion means further comprise dacron strips adhered to said belt.

7. The system according to claim 2 further comprising a vacuum channel around the perimeter of the platen.

8. The system according to claim 7 wherein, when said window area completely overlies the platen, said sealed area of said second side surrounding the window area overlies said channel.

9. The system according to claim 8 wherein, when said window area completely overlies the platen, the distance from the edge of the window area to the channel is within the range of approximately one-eighth to one-half inch.

10. The system according to claim 2 wherein said sealant is applied to a second side belt aperture defining area within said window area.

11. The system according to claim 3 wherein said vacuum pick-up bar is secured to a flexible compressible pad which is secured on the other side thereof to the upper surface of said belt, sealant being applied to said flexible compressible pad in the area surrounding said belt aperture.

12. The system according to claim 1 wherein said edge blow means further comprise a front edge blow directing positive airflow toward the lead edge of the photosensitive material.

13. The system according to claim 12 further comprising photosensitive material cutting means, said photosensitive material being advanced from the photosensitive material supply until a desired length of material has been advanced, said vacuum pick-up bar and said belt being lowered by said lifting means to engage the photosensitive material with vacuum applied to said transport belt aperture, said vacuum pick-up bar belt and photosensitive material being lifted by said lifting means for transport and said transport belt being moved to transport the photosensitive material across the platen and to center the photosensitive material over the platen, said vacuum pick-up bar, belt and photosensitive material being lowered by said lifting means onto the platen.

14. The system according to claim 13 further comprising a vacuum channel adjacent the platen, vacuum being applied to said vacuum channel to hold down said belt and the photosensitive material to the platen for exposure, said vacuum to said channel being terminated after exposure, said lifting means thereafter being activated to lift said vacuum bar and said belt away from the photosensitive material and the platen, said front edge blow means being activated to blow air under the lead edge of the photosensitive material to release the photosensitive material from the platen, said lifting means thereafter being activated to lower said vacuum pick-up bar and belt onto the platen, vacuum thereafter being applied to said belt apertures to adhere the exposed photosensitive material to the belt, said vacuum pick-up bar, belt and exposed photosensitive material being lifted away from the platen by said lifting means for transport of the photosensitive material to a processing station.

15. A method of operating a camera including a supply of photosensitive material having a lead edge, a platen to receive the photosensitive material, an optical system to expose the photosensitive material, and an automatic vacuum feed and hold down assembly having a movable, flexible opaque transport belt disposed substantially parallel to the platen, the belt having at least one belt aperture therethrough and a window area on the side facing the platen, a vacuum pick-up bar mounted to the top of the belt away from the platen having at least one pick-up bar opening corresponding to and aligned with the transport belt aperture so that vacuum applied to the pick-up bar is transmitted through the belt aperture, lifting means for adjusting the position of the vacuum pick-up bar and belt relative to the platen, a vacuum channel adjacent the platen, and front edge blow means for supplying positive airflow toward the lead edge of the photosensitive material, the method comprising:

(i) advancing the photosensitive material from the photosensitive material supply until the photosensitive material is partially disposed on the platen;

(ii) activating the lifting means to lower the belt into contact with the photosensitive material;

(iii) supplying vacuum to the vacuum pick-up bar so as to cause the photosensitive material to adhere to the belt;

(iv) activating the lifting means to lift the vacuum pick-up bar, belt and photosensitive material away from the platen;

(v) advancing the movable transport belt with the photosensitive material adhered thereto across the platen until the photosensitive material is centered over the platen;

(vi) activating the lifting means to lower the belt and photosensitive material into contact with the platen;

(vii) applying vacuum to the channel adjacent the platen as the belt is lowered and thereafter in order to hold down the belt and photosensitive material for exposure;

(viii) terminating the vacuum to the vacuum pick-up bar;

(ix) exposing the photosensitive material;

(x) terminating vacuum to the channel;

(xi) activating the lifting means to lift the belt away from the photosensitive material and the platen;

(xii) activating the front edge blow means to release the photosensitive material from the platen;

(xiii) activating the lifting means to lower the belt onto the platen in contact with the photosensitive material;

(xiv) applying vacuum to the vacuum pick-up bar so as to cause the exposed photosensitive material to adhere to the belt;

(xv) activating the lifting means to lift the vacuum pick-up bar, belt and exposed photosensitive material away from the platen; and (xvi) advancing the movable transport belt to advance the exposed photosensitive material for processing.

16. The method according to claim 15 wherein the front edge blow means is activated substantially simultaneously to activation of the lifting means to lift the belt away from the photosensitive material and the platen.

17. The method according to claim 15 wherein the camera system further includes means for cutting a length of photosensitive material from the photosensitive material supply, the method further comprising the following steps performed immediately preceding step (v):

advancing the movable transport belt with the photosensitive material adhered thereto across the platen to a pre-determined cutting position;

activating the cutting means to cut a desired length of photosensitive material.

18. The method according to claim 15 wherein the photosensitive material is adhered to the belt within the window area.

19. The method according to claim 18 wherein the belt overlies the vacuum channel outside the window area.

20. The method according to claim 19 wherein the natural curl of the photosensitive material, together with the air flow from the front edge blow means toward the photosensitive material lead edge, cause the exposed photosensitive material to lift away from the platen and move toward the belt disposed above the platen.

21. A method of releasing photosensitive material from a platen in a camera including a supply of photosensitive material having a lead edge, an optical system to expose the photosensitive material, and an automatic vacuum feed and hold down assembly having a movable, flexible opaque transport belt disposed substantially parallel to the platen, the belt having belt vacuum means for causing the photosensitive material to adhere to the belt, lifting means for adjusting the position of the belt relative to the platen, a vacuum channel adjacent the platen, and edge blow means for supplying positive airflow toward an edge of the photosensitive material, wherein vacuum is applied to the vacuum channel in order to hold the belt and photosensitive material against the platen for exposure, the method comprising (i) terminating vacuum to the channel;

(ii) activating the lifting means to lift the belt away from the photosensitive material and the platen;

(iii) activating the edge blow means to release the photosensitive material from the platen;

(iv) activating the lifting means to lower the belt onto the platen in contact with the photosensitive material;

(v) activating the belt vacuum means so as to cause the exposed photosensitive material to adhere to the belt;

(vi) activating the lifting means to lift the belt and exposed photosensitive material away from the platen; and (vii) advancing the movable transport belt to advance the exposed photosensitive material for processing.

22. The method according to claim 21 wherein activation of the belt vacuum means in step (v) occurs substantially simultaneously to activation of the lifting means in step (iv) to lower the belt.

23. The method according to claim 22 wherein the natural curl of the photosensitive material, together with the air flow from the edge blow means toward the photosensitive material edge and the substantially simultaneous activation of the belt vacuum means, cause the exposed photosensitive material to lift away from the platen and move toward the belt disposed above the platen.

24. The method according to claim 21 wherein the edge blow means is activated substantially simultaneous to activation of the lifting means to lift the belt away from the photosensitive material and the platen.

25. The method according to claim 21 wherein the positive airflow from the edge blow means is directed toward the lead edge of the photosensitive material.

* * * * *